Figure 1:
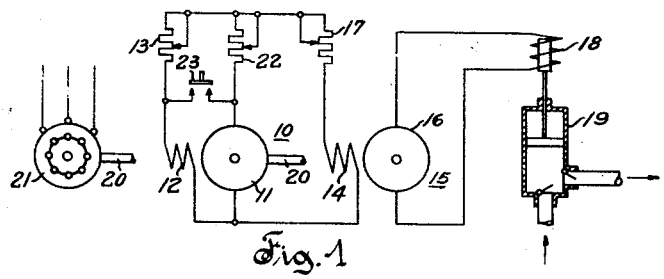

Inventor
William L. Ringland
by Didier Jouneaux
Attorney

Jan. 23, 1951         W. L. RINGLAND         2,539,273
ALTERNATING CURRENT GENERATOR

Filed May 31, 1944                                2 Sheets—Sheet 2

Inventor
William L. Ringland
by Didier Journeaux
Attorney

Patented Jan. 23, 1951

2,539,273

UNITED STATES PATENT OFFICE 2,539,273

ALTERNATING CURRENT GENERATOR

William L. Ringland, West Allis, Wis., assignor, by mesne assignments, to the United States of America as represented by the United States Atomic Energy Commission Application May 31, 1944, Serial No. 538,160

2 Claims. (Cl. 322—61)

This invention relates in general to improvements in alternating current generators, and more particularly to means for coupling the armature circuit and the field circuit of a dynamoelectric machine of the commutator type to cause the machine to generate alternating current.

Alternating current may be generated by an electric motor of the polyphase commutator type driven by a suitable prime mover if the field circuits of the machine are connected with suitably disposed brushes. Dynamoelectric machines of the direct current type may also be adapted for generating alternating current by connecting the field circuit across the armature winding through a capacitor. The first method requires that the machine be specially designed for that purpose and the second requires the use of capacitors or of equivalent devices which render the system costly and difficult to adjust, especially when current of frequencies of the order of one cycle per second are to be produced.

It is therefore preferable to utilize a direct current generator of usual construction and to cause the voltage thereof to become alternating by coupling the field and armature circuits of the machine through suitable impedance means common to both circuits. Such impedance means may often consist simply of a resistor which may be easily adjusted to the value required for operation of the machine at the desired frequency. This arrangement is particularly convenient when the generator serves to excite the field of another commutator type dynamoelectric machine. The second machine may supply current to a load circuit, or receive current from or supply current to the secondary winding of an alternating current motor of which the speed is to be regulated. Polyphase alternating currents may be caused to be generated by a plurality of generators of the type herein considered by providing suitable interconnections between the machines.

It is therefore one object of the present invention to provide an improved generator of the commutator type for delivering alternating current of a frequency which may be easily adjusted to a predetermined value.

Another object of the present invention is to provide a commutator type dynamoelectric machine in which the armature circuit and the field circuit are interlinked in such manner as to cause the machine to generate alternating current.

Another object of the present invention is to provide suitable connections between a plurality of dynamoelectric machines of the commutator type to cause the machines to generate polyphase alternating currents.

Figure 2:
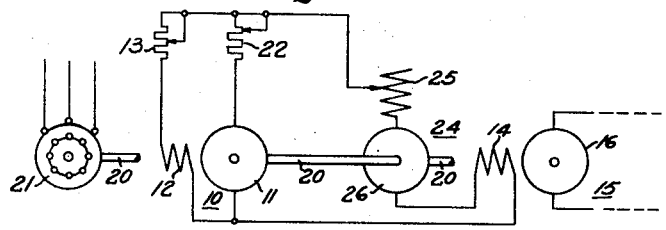
Figure 3:
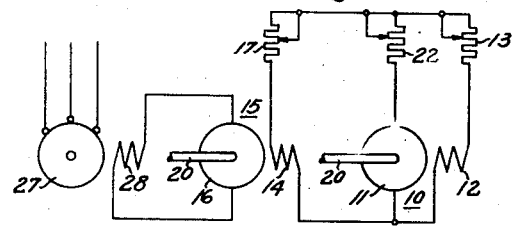
Figure 4:
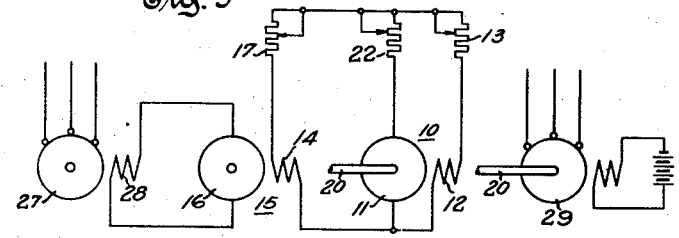
Figure 5:
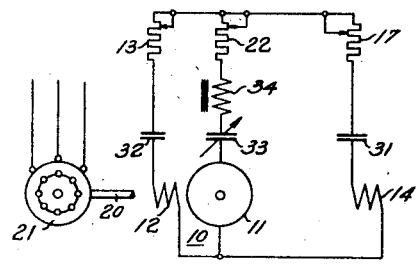
Figure 6:
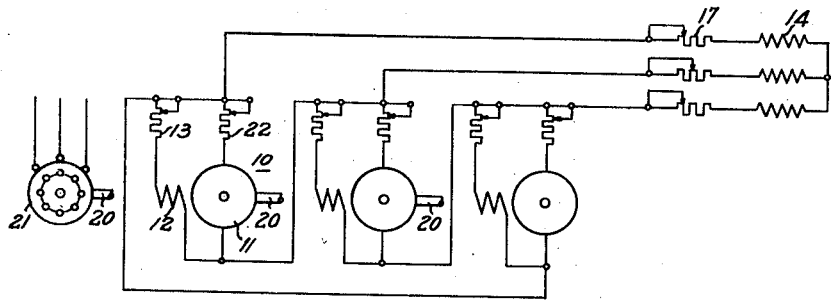
Figure 7:
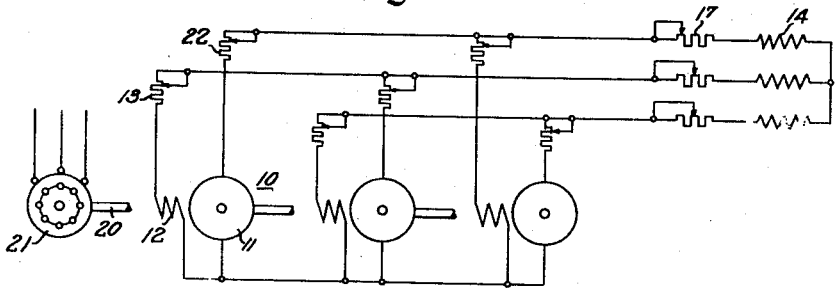
Figure 8:
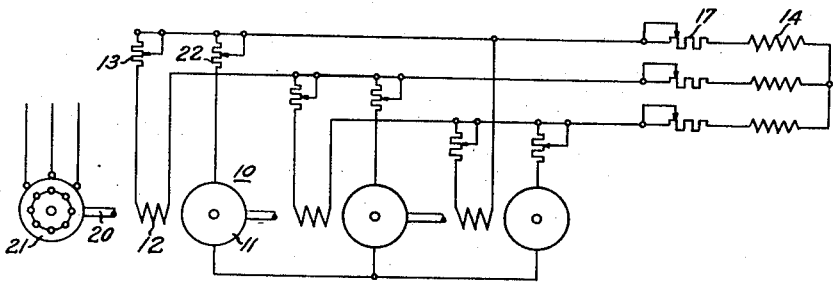

Objects and advantages other than those above set forth will be apparent from a consideration of the following description when read in connection with the accompanying drawing, in which:

Fig. 1 diagrammatically illustrates one embodiment of the present invention utilizing a coupling resistor and serving to supply alternating current to a solenoid;

Fig. 2 diagrammatically illustrates another embodiment of the present invention differing from the embodiment illustrated in Fig. 1 by the addition of a series generator functioning as a negative resistor;

Fig. 3 diagrammatically illustrates a system utilizing the embodiment illustrated in Fig. 1 for controlling the secondary current of an alternating current motor;

Fig. 4 diagrammatically illustrates a modified form of the system illustrated in Fig. 3 in which the alternating current motor and the dynamoelectric machines associated therewith are mounted on separate shafts;

Fig. 5 diagrammatically illustrates another embodiment of the present invention for supplying alternating current to load devices of various types;

Fig. 6 diagrammatically illustrates a system for generating three phase alternating current comprising three generators of the type illustrated in Fig. 1 in delta connection;

Fig. 7 diagrammatically illustrates another system for generating three phase alternating current in which the generator armature windings are connected in star and the field windings of the different generators are cross connected; and Fig. 8 diagrammatically illustrates a modification of the embodiment illustrated in Fig. 7 in which the field circuits of the different generators are connected in delta.

Referring more particularly to Fig. 1 of the drawing by characters of reference, a generator 10 comprises an armature winding 11 of any suitable known type associated with a commutator and so illustrated conventionally on the drawing. Generator 10 is also provided with a field winding 12 which is preferably associated with a fully laminated magnetic structure. Field winding 12 may be of any conventional type and the different portions thereof associated with the several poles of the machine may be connected in series, in parallel or in series parallel to impart to the field circuit the most advantageous value of inductance. The resistance of the field circuit may be controlled by means of a field rheostat 13 inserted therein.

Generator 10 supplies current to a load circuit of inductive character comprising the field winding 14 of a second generator 15 having an armature winding 16 associated with a commutator and so illustrated conventionally on the drawing. The field circuit of generator 15 may comprise a second field rheostat 17. Generator 15 is also preferably provided with a fully laminated magnetic structure as field winding 14 thereof is to be excited with alternating current. Armature 16 supplies alternating current to any suitable load such as a solenoid 18 for actuating a reciprocating pump 19. Armatures 11 and 16 may be mounted on a common shaft 20 driven by suitable means such as an electric motor 21.

To cause generator 10 to supply winding 14 with alternating current, the circuits of armature winding 11 and of field winding 12 are linked by a suitable impedance means common to both circuits such as an adjustable resistor 22 of a value which will be assumed to include the resistance of armature winding 11. Resistor 22 is so dimensioned that current fluctuations in field winding 12 result in current fluctuations lagging with respect thereto in armature winding 11. More specifically, resistor 22 is so dimensioned that an alternating voltage impressed from armature winding 11 on resistor 22 and the circuits of field windings 12 and 14 causes the flow in winding 12 of a current of the magnitude, frequency and phase required to cause generation of the alternating voltage under consideration in armature winding 11. The system then maintains itself automatically in oscillation after being given an initial impulse in any suitable manner.

In operation, armatures 11 and 16 being driven by motor 21, the residual magnetism of generator 10 causes the armature voltage to build up gradually, provided that the resistances of the armature and field circuits of the machine are relatively low. If resistors 13 and 22 are of too high value to enable the machine voltage to build up, the resistors may be short-circuited momentarily by means of a push button switch 23.

In the process of excitation, armature winding 11 supplies an increasing current to field winding 12, and winding 12 in turn causes to be generated in winding 11 a voltage which varies with the current in the field winding. As a result of the highly inductive character of winding 14, however, the current supplied to winding 14 increases more slowly than the current in winding 12. The fluctuations of the total current through armature 11 are thus caused to occur with a time lag with respect to the fluctuations of the current in field winding 12.

When the magnetic circuit of generator 10 approaches saturation the voltage induced in armature 11 increases less rapidly. At the same time the current in winding 14, the rise of which was delayed by the inductance of the winding, then continues to increase and to produce an increasing voltage drop in resistor 22. As a result thereof, the voltage impressed on field winding 12 decreases, thereby causing the voltage generated in armature winding 11 to decrease toward zero. When the voltage of armature winding 11 reaches zero the flow of current through the armature is maintained by the inductance of winding 14, and the circuit of winding 12 receives current under a voltage equal to the voltage drop in resistor 22. This voltage drop is of polarity opposite to that of the voltage previously generated in armature winding 11 and the voltage of the armature winding is thereby caused to reverse. The above outlined sequence of operation thereupon again takes place but with the different voltages and currents reversed in polarity. Such reversal continues to take place periodically to cause the voltage and the current of the load circuit to be alternating.

The necessary relation between the dimensions of the elements of the system to cause the voltage of armature winding 11 to be alternating may be obtained by applying to the system the laws of electric circuits. The relation thus obtained may be expressed in the form $$R_1 = \frac{E}{I_1} - R\left(1 + \frac{L_1}{L_2}\right) - R_r\frac{L_1}{L_2}$$

wherein $R_1$ is the resistance of the circuit of field winding 12

$$\frac{E}{I_1}$$

is the voltage generated in armature winding 11 per ampere of current in field winding 12, $R$ is the resistance of resistor 22, $R_2$ is the resistance of the load circuit consisting of winding 14 and rheostat 17, $L_1$ is the inductance of the circuit of field winding 12 and $L_2$ is the inductance of the load circuit, the inductance of armature winding 11 being assumed to be negligible.

From this relation it may be seen that the resistance $R_1$ of the field circuit of generator 10 must be maintained at a value materially less than $$\frac{E}{I_1}$$

whereas in a direct current generator the resistance of the field circuit may have any value up to $$\frac{E}{I_1}$$

Of course, if the value of $R_1$ is predetermined the above relation may be used to find the value of any other element of the system.

If all the values involved in the above relation were absolutely constant it would be practically impossible to maintain the system in stable operation. If $R_1$ were too large by any amount the voltage of generator 10 would gradually decrease to zero. If $R_1$ were too small by any amount the magnitude of the voltage of generator 10 would gradually increase indefinitely. Stable operation is rendered possible because of the fact that when the current of field winding 12 increases the magnetic circuit of generator 10 gradually becomes saturated. As a result thereof, the quantities $$\frac{E}{I_1}$$

and $L_1$ gradually decrease until the above relation is met and the operation of the system may continue indefinitely at a substantially constant voltage. The frequency $f$ of the voltage of generator 10 is given by the relation $$f = \frac{1}{2\pi}\sqrt{\frac{RR_1}{L_1L_2} - \frac{RR_2}{L_2^2} - \frac{R_2^2}{L_2^2}}$$

From this second relation it may be seen that the time constant $$\frac{L_1}{R_1}$$

of the field circuit of generator 10 must be substantially smaller than the time constant $$\frac{L_2}{R_2}$$

of the load circuit.

In the embodiment illustrated in Fig. 2 the load circuit includes a series connected dynamoelectric machine 24 comprising a field winding 25, and an armature winding 26 associated with a commutator and so illustrated conventionally on the drawing. Armature 26 is preferably driven by motor 21. In a series connected dynamoelectric machine such as machine 24, the voltage generated in the armature is proportional to the machine current and may be considered to be of the same polarity as the current, whereas in a resistor the voltage is proportional to the current but of opposite polarity. Machine 24 therefore assumes the character of a negative resistor and serves to reduce the resistance $R_2$ of the load circuit when such reduction is necessary or convenient to bring the values of the circuit elements in the required relationship above set forth. The effect of machine 24 may be varied by connecting resistor 22 with different taps provided on field winding 25.

In the embodiment illustrated in Fig. 3 armatures 11 and 16 are driven by an alternating current motor comprising a primary winding 27 and a secondary winding 28 connected with armature 16. In the present embodiment generator 10 functions as in the embodiment illustrated in Fig. 1 to supply current of a predetermined frequency to field winding 14 and thereby cause a voltage of the same frequency to be generated in armature winding 16. As a result thereof, the flow of current in secondary winding 28 is forced to take place at the predetermined frequency, whereby motor 27, 28 is caused to rotate at one of two predetermined constant speeds.

In the course of this operation, if motor 27, 28 is rotating at a speed below synchronous speed machine 15 functions as a motor receiving electrical energy from secondary winding 28 and converting this energy into mechanical energy delivered to the common shaft 20 of the machines. If, however, motor 27, 28 rotates at a speed above synchronous speed machine 15 functions as a generator as in the embodiment illustrated in Fig. 1 to supply current to winding 28.

In this manner generators 10 and 15 are not fully utilized as their speed is reduced below normal speed thereof when the speed of motor 27, 28 is below synchronous speed. It is then sometimes preferable to mount generators 10 and 15 on a shaft separate from the shaft of motor 27, 28 as shown in Fig. 4. Generator 15 when functioning as a motor, may serve to drive any constant speed energy absorbing or converting such as a synchronous generator 29.

While in the embodiments illustrated in Figs. 1 to 4 the field and armature circuits of generator 10 are linked by only a resistor, other impedance means may be used in addition to the resistor or in place thereof to vary the frequency of the generator voltage and to take into account the character of the load circuit. Fig. 5 diagrammatically illustrates a load circuit comprising a capacitor 31 in addition to rheostat 17 and winding 14. Likewise the field circuit of generator 10 may comprise a capacitor 32 in addition to field winding 12 and rheostat 13. Resistor 22 may be supplemented or replaced by a capacitor 33 or by inductive reactor 34 or by both, the different elements being connected in series or in parallel according to the desired characteristics to be obtained.

The relations to be maintained between the circuit elements of Fig. 5 to cause generator 10 to deliver alternating current are similar to those above set forth but are rendered considerably more complicated by the introduction therein of the values of the additional circuit elements. As in the embodiment illustrated in Fig. 1 the elements must be so adjusted that an alternating voltage impressed from armature winding 11 on the impedance means 22, 23, 34 and on the field circuit of generator 10 will cause the flow in the field circuit of a current of the magnitude, frequency, and phase required to generate the alternating voltage considered in the armature winding.

In the embodiments illustrated in Figs. 1 and 5 the current of generator 10 is a single phase current which may be utilized in single phase load devices, but it is sometimes advantageous or necessary to provide a source of polyphase current of a predetermined number of phases and of a frequency within the range of frequencies obtainable from generator 10. In particular, a generator supplying two or three phase current is preferable to a generator supplying single phase current for controlling the flow of current through the secondary winding of an alternating current motor. Polyphase current generators may be devised by providing a plurality of generators similar to generator 10 and by providing suitable interconnections between the generators to cause the currents thereof to maintain their proper phase relation.

Different systems of connections may be utilized depending upon the characteristics of the machines and of the load circuits. As illustrated in Fig. 6 three generators similar to generator 10 of Fig. 1 may have the armatures thereof driven by motor 21 common thereto. The generators are connected in delta so that any tendency of the voltages of the generators to depart from the proper phase relation therebetween is overcome by the flow of a corrective current in the closed circuit formed by the generators.

In the embodiment illustrated in Fig. 7 the generator armature windings are connected in star and the armature winding of each generator supplies current of the proper magnitude and phase to the field circuit of another of the generators.

In the embodiment illustrated in Fig. 8 the generator armature windings are again connected in star but the field windings are connected in delta. This connection may be used when the generator field windings require current at a higher power factor than may conveniently be supplied with the connections illustrated in Fig. 7.

Although but a few embodiments of the present invention have been illustrated and described it will be apparent to those skilled in the art that various changes and modifications may be made therein without departing from the spirit of the invention or from the scope of the appended claims.

It is claimed and desired to secure by Letters Patent:

1. In an alternating current generating system, a dynamoelectric machine comprising a field circuit, an armature winding and a commutator, a reactive load circuit connected in parallel with said field circuit, and means for connecting said armature winding across said circuits comprising said commutator and a resistor, the resistance of said field circuit being given by the relation $$R_1 = \frac{E}{I_1} - R\left(1 + \frac{L_1}{L_2}\right) - R_2\frac{L_1}{L_2}$$

wherein $R_1$ is the resistance of said field circuit, $$\frac{E}{I}$$

is the voltage generated in said armature winding per unit of current in said field circuit, R is the resistance of said resistor, $R_2$ is the resistance of said load circuit, $L_1$ is the inductance of said field circuit and $L_2$ is the inductance of said load circuit.

2. In an alternating current generating system, a dynamoelectric machine comprising a field circuit having a predetermined time constant, an armature winding and a commutator, a reactive load circuit having a time constant which is greater than the first said time constant connected in parallel with said field circuit, and means for connecting said armature winding across said circuits comprising said commutator and a resistor, the resistance of said field circuit being given by the relation $$R_1 = \frac{E}{I_1} - R\left(1 + \frac{L_1}{L_2}\right) - R_2\frac{L_1}{L_2}$$

wherein $R_1$ is the resistance of said field circuit, $$\frac{E}{I}$$

is the voltage induced in said armature winding per unit of current in said field circuit, R is the resistance of said resistor, $R_2$ is the resistance of said load circuit, $L_1$ is the inductance of said field circuit and $L_2$ is the inductance of said load circuit.

WILLIAM L. RINGLAND.

REFERENCES CITED

The following references are of record in the file of this patent:

UNITED STATES PATENTS

| Number | Name | Date |
|---|---|---|
| 613,204 | Hutin et al. | Oct. 25, 1898 |
| 1,460,213 | Roosevelt | June 26, 1923 |
| 1,506,750 | Hellmund | Sept. 2, 1924 |
| 1,669,609 | Fortescue | May 15, 1928 |
| 1,673,598 | Slepian | June 12, 1928 |
| 2,380,431 | Harding et al. | July 31, 1945 |